United States Patent
Matsushima

(10) Patent No.: US 6,281,608 B1
(45) Date of Patent: Aug. 28, 2001

(54) SPINDLE MOTOR AND TURN TABLE ASSEMBLY HAVING STRUCTURE FOR CANCELING UNBALANCED CENTRIFUGAL FORCE

(75) Inventor: Shunji Matsushima, Nagano (JP)

(73) Assignee: Kabushiki Kaisha Sankyo Seiki Seisakusho, Nagano (JP)

(*) Notice: Subject to any disclaimer, the term of this patent is extended or adjusted under 35 U.S.C. 154(b) by 0 days.

(21) Appl. No.: 09/427,485

(22) Filed: Oct. 27, 1999

Related U.S. Application Data

(63) Continuation-in-part of application No. 09/060,472, filed on Apr. 15, 1998, now Pat. No. 6,005,311.

(30) Foreign Application Priority Data

Apr. 16, 1997 (JP) ........................................ 9-98751

(51) Int. Cl.[7] ............................... H02K 5/24; G11B 21/22; G11B 17/04
(52) U.S. Cl. ....................... 310/51; 310/67 R; 360/98.07; 360/99.04; 360/99.05; 360/99.08
(58) Field of Search ................................... 310/51, 67 R, 310/91, 80, 268; 360/99.04, 99.08, 99.07, 99.05

(56) References Cited

U.S. PATENT DOCUMENTS

| Re. 7,455 | * | 1/1877 | Fesca | 310/51 |
|---|---|---|---|---|
| 3,751,044 | | 8/1973 | Sawada | 369/264 |
| 4,730,299 | | 3/1988 | Kamoshita et al. | 369/264 |
| 4,874,976 | * | 10/1989 | Ohsawa et al. | 310/268 |
| 5,748,406 | | 5/1998 | Morimoto et al. | 360/99.12 |
| 5,757,762 | | 5/1998 | Lee | 369/271 |
| 5,883,454 | * | 3/1999 | Hones et al. | 310/90.5 |
| 6,016,238 | * | 1/2000 | Yoshikawa et al. | 360/99.08 |

* cited by examiner

Primary Examiner—Tran Nguyen
(74) Attorney, Agent, or Firm—Sughrue, Mion, Zinn, Macpeak & Seas, PLLC

(57) ABSTRACT

A spindle motor includes a shaft 6 which is rotatably supported; a rotor casing 7 which is turned together with the shaft 6; and a turn table 9 which is fixedly mounted on one end portion of the shaft 6 and is rotated with a disk 10 mounted thereon. An eccentric member 12 is loosely fitted on the part of the shaft 12 which is located between the rotor casing 7 and the turn table 9. The eccentric member 12 is turned with the rotation of the rotor casing 7. In place of the eccentric member, a ball may be arranged which is rolled around the shaft.

8 Claims, 6 Drawing Sheets

SPINDLE MOTOR AND TURN TABLE ASSEMBLY HAVING STRUCTURE FOR CANCELING UNBALANCED CENTRIFUGAL FORCE

This is a Continuation-in-Part of appliction Ser. No. 09/060,472 filed Apr. 15, 1998, U.S. Pat. No. 6,005,311, the disclosure of which is incorporated herein by reference.

BACKGROUND OF THE INVENTION

1. Field of the Invention

This invention relates to a spindle motor adapted to rotate a data record disk (hereinafter referred to merely as "a disk", when applicable) such as CD, DVD, CD-ROM and DVD-ROM, and more particularly to a spindle motor which suppresses the swing or vibration of the shaft which attributes to the eccentric gravity center during rotation.

2. Related Art

In general, in a spindle motor adapted to turn a disk, a turn table is fitted on one end of the shaft, and a disk is mounted on the turn table. The turn table has a circular-truncated-cone-shaped or semi-spherical protrusion at the center, while the disk has a central hole. With the protrusion engaged with the central hole of the disk, the central position is determined.

When the turn table is turned by the spindle motor, the disk is also turned together with the turn table, so that the signals recorded on the recording track of the disk are read by a reading section such as an optical pickup. In the case of a rewritable or writable disk, data signals can be rewritten or written in the disk. As in the case of a recent CD-ROM drive unit, in order to increase the data reading and writing speed there is a tendency to increase the speed of rotation of the disk. Accordingly, there has been a strong demand for the provision of a spindle motor which can turn the disk at higher speed.

However, if the speed of rotation of the disk is increased, then the unbalance of the centrifugal force is increased which occurs during the rotation of the disk, as a result of which the shaft is rotated while swinging. When the shaft turns while swinging, and its vibration is increased, then it is difficult for the reading section to accurately read data signals recorded on the disk, or it is difficult for the writing section to accurately write data signals on the disk.

In general, the centrifugal force attributing to the eccentric gravity center of a disk is proportional to the square of the speed of rotation, and as the speed of rotation increases, the swinging and vibrating of the shaft is extremely increased. Accordingly, the swinging and vibrating of the shaft, which attribute to the eccentric gravity center, are serious problems when it is required to increased the speed of rotation of the disk.

SUMMARY OF THE INVENTION

Accordingly, an object of the invention is to eliminate the above-described difficulties accompanying a conventional spindle motor. More specifically, an object of the invention is to provide a spindle motor in which during rotation of the disk the unbalance of the centrifugal force which attributes to the eccentric gravity center is canceled out, whereby even when the disk is turned at high speed, the swinging of the shaft can be suppressed, and the vibration of the same is also suppressed, which makes it possible to read data signals from the disk or to write data signals on the disk.

According to an aspect of the present invention, there is provided a spindle motor including a shaft rotatably supported, a rotor casing turned together with said shaft, a turn table fixedly mounted on one end portion of said shaft and rotated with a disk mounted thereon, an eccentric member loosely mounted on the part of said shaft which is located between said rotor casing and said turn table, and which is turned with the rotation of said rotor casing.

In the spindle motor of the invention, the eccentric member or the ball are provided as the movable balance member. This feature makes it possible to cancel out the unbalanced centrifugal force which attributes to the eccentric gravity center of the disk, and to suppress, even when the disk is turned at high speed, the swinging of the shaft or turn table; that is, to decrease the vibration thereof. As a result, data signals can be accurately read from the disk, and can be accurately written in the latter.

DETAILED DESCRIPTION OF THE PREFERRED EMBODIMENTS

Preferred embodiments of the invention will be described with reference to the accompanying drawings.

Figure 1:
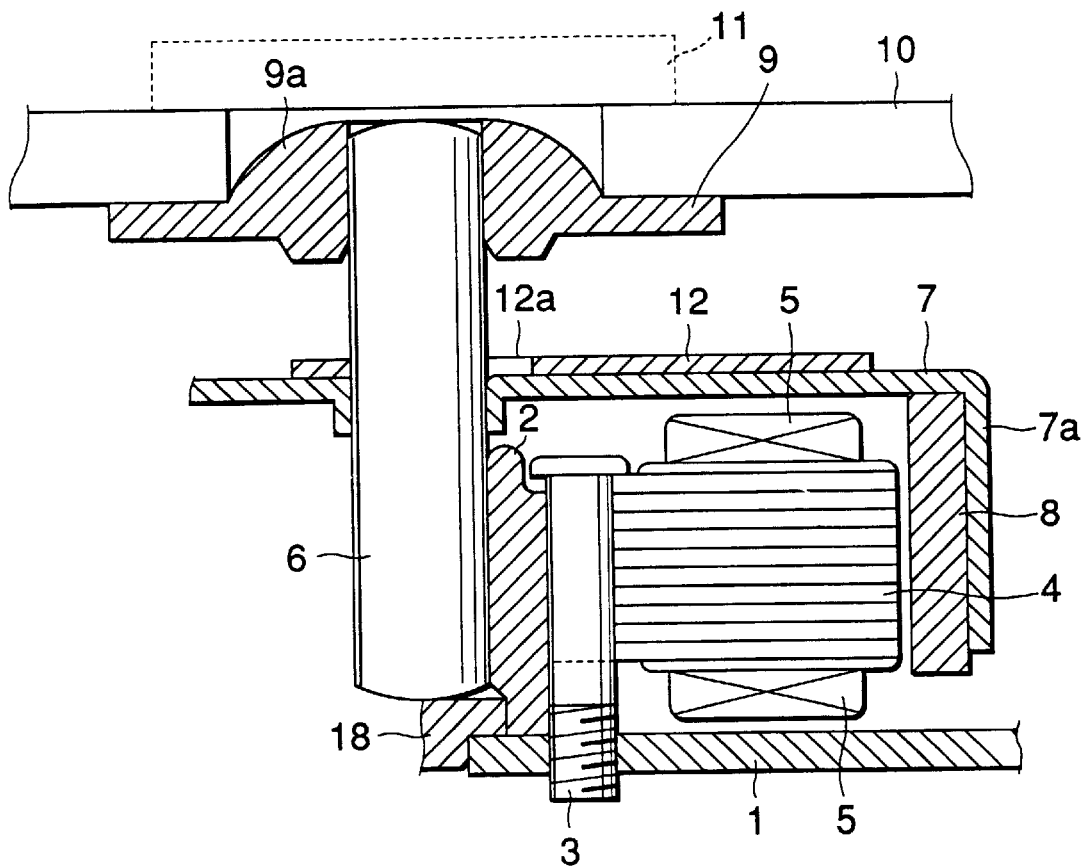
FIG. 1 is a sectional view showing the arrangement of an example of a spindle motor, which constitutes an embodiment of the invention.

FIG. 1 shows a disk 10 mounted on a turn table 9. Reference numeral 1 denotes a motor base board. The motor base board 1 has a hole at the center in which a thrust receiver 18 is fitted. The thrust received is surrounded by one end portion of a cylindrical bearing 2. The bearing 2 is secured to the motor base board 1 with screws 3.

A stator core 4 is set outside the bearing 2 in such a manner that the fore 4 is coaxial with the latter 2. The stator core 4 is secured to the bearing 2 and the motor base board 1 with the screws 3. The stator core 4 is formed by stacking a plurality of core elements, and has protruded poles which are radially outwardly extended. A drive coil 5 is wound on each of the protruded poles.

A shaft 6 is fitted in the bearing 2, thus being rotatably supported by the bearing 2. The load in the direction of thrust of the shaft is supported by the thrust received. A cup-shaped rotor casing 7 has a central hole, into which the upper portion of the shaft 6 is press-fitted which is protruded from the upper end surface of the bearing 2, so that the shaft 6 and the rotor casing 7 are provided as one unit. The rotor casing 7 covers the stator of the motor including the stator core 4, and a drive magnet 8 is fixedly mounted on the inner cylindrical surface of the rotor casing 7. The inner cylindrical surface of the drive magnet 8 is confronted through a suitable gap with the outer end faces of the protruded poles which define the outer cylindrical surface of the stator core 4.

The one end portion of the shaft 6, which is protruded from the upper surface of the rotor casing 7 is press-fitted in the central hose of a disk-shaped turn table 9 on which a disk 10 is mounted. The shaft 6 and the turn table 9 form one unit. A semi-spherical protrusion 9a is formed at the center of the upper surface of the turn table 9. The diameter of the protrusion 9a is substantially equal to the diameter of the central hole of a disk 10. The disk 10 is mounted on the turn table 9 while the edge of the central hole thereof being guide by the outer peripheral edge of the protrusion 9a, so that the disk 10 is positioned in such a manner that the turn table 9 is coaxial with the disk 10. An energizing member which is movable radially may be provided on the outer cylindrical surface of the protrusion 9a to elastically position the disk.

A rubber member (not shown) is mounted on the surface of the turn table on which a disk 10 is mounted, in order to prevent the slip of the disk 10.

Disk fixing means for fixing the disk 10 may be designed as follows: a clamp member 11 is set above the turn table 9 in such a manner that it confronts with the disk mounting surface turn table 9. In this case, for instance, a magnet is buried in a part of the clamp member or the turn table 9 so that the magnetic attraction force between the turn table 9 and the clamp member 11 is utilized to attract the clamp member 11 towards the turn table 9, thereby to fix the disk 10.

In the spindle motor thus constructed, the application of current to the drive coil 5 of each of the protruded poles are controlled on and off according to the position of rotation of the drive magnet 8, so that the drive magnet 8, the rotor casing 7, the shaft 6, and the turn table 9 are rotated; that is, the disk mounted on the turn table is rotated.

As was described before, if, in order to increase the speed of reading recording signals from the disk 10 or writing data signals on the latter 10, the speed of rotation of the disk 10 is increased, then as the centrifugal force increases the amount of unbalance attributing to the slight eccentric gravity center is increased, so that the swinging of the disk 10 or the turn table 9 is increased. As the swinging of the disk 10 is increased, it is impossible to accurately read data signal from the disk 10, and to accurately write data signal in the disk 10.

Figure 2A:
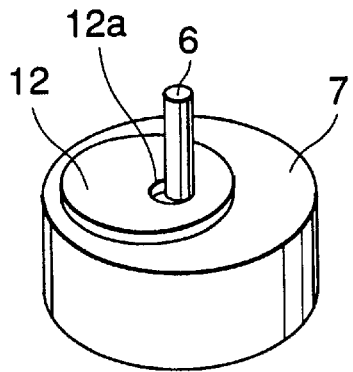
FIGS. 2(a) and 2(b) are perspective views showing examples of an eccentric member applicable to the spindle motor of the invention.

In order to overcome this difficulty, in the embodiment, a movable balance member, or an eccentric member 12 is loosely mounted on the shaft 6 between the rotor casing 7 and the turn table 9. This will be described more concretely below: As shown in FIG. 1 and the part (a) of FIG. 2, the eccentric member 12 is like a disk made of metal or resin, and has a relatively large hole 12a at a position far from the gravity center which is larger in diameter than the shaft 6. The shaft 6 is inserted into the hole 12a; that is, the eccentric member 12 is loosely mounted on the shaft 6, and is laid on the rotor casing 7. In the embodiment, the unbalance which may be caused by the eccentric gravity center of the disk 10 when turned is canceled out by the action of the eccentric member, whereby the swinging of the shaft is suppressed, and the production of vibration is also suppressed.

Figure 3:
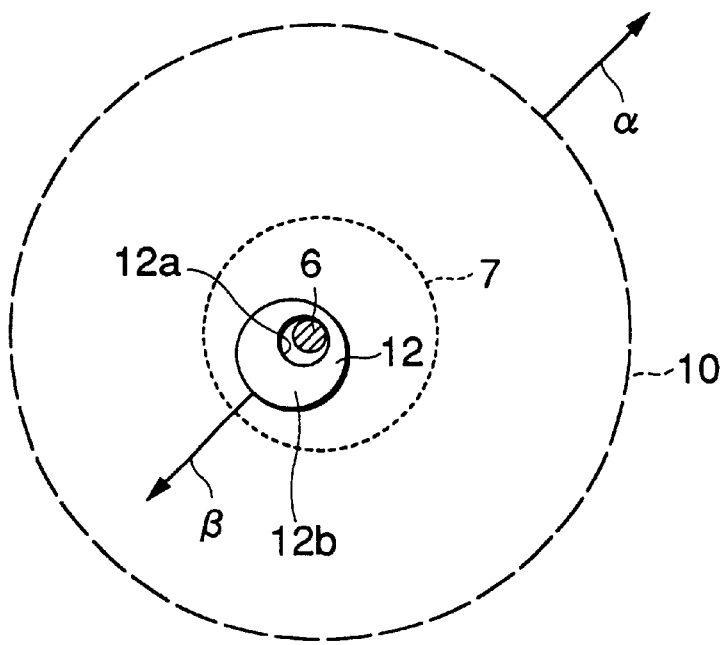
FIG. 3 is an explanatory diagram for a description of the action of the eccentric member applicable to the spindle motor of the invention.

When the rotor casing 7 is turned by the rotation of the spindle motor, the eccentric member 12 thereon is rotated in the same direction as the rotor casing 7. Immediately after the rotation of the rotor casing 7 is started, the direction of the eccentric member is not always constant. As the speed of rotation of the spindle motor increases, the speed of rotation of the disk 10 is also increased. The disk 10 has the eccentric gravity center. Even if the eccentric gravity center is slight, as the speed of rotation of the disk 10 increases, the unbalance of centrifugal force is increased. If the motor has no eccentric member, then the swinging of the turn table and the disk is increased. As shown in FIG. 3, if the direction of the eccentric gravity center of the disk 10 is $\alpha$, then, in the eccentric member 12, the direction of a wide arcuate section 12b which occupies a relatively wide area with the hole 12a as the center, is $\beta$ which is opposite to the direction a of the eccentric gravity center of the disk 10. That is, the centrifugal force which cancels out the unbalance of the centrifugal force attributing to the eccentric gravity center of the disk, is produced in the eccentric member 12. As is apparent from the above description, the eccentric member 12 turns together with the rotor casing 7, the turn table 9, and the disk 10 while maintaining itself in the direction in which the unbalance of the centrifugal force attributing to the eccentric gravity center is canceled out.

As was described above, the unbalanced centrifugal force produced in the disk 10 can be canceled out by the unbalanced centrifugal force attributing to the rotation of the eccentric member 12. Hence, even when the disk 10 is turned at high speed, the swinging of the shaft 6, the turn table 9, and the disk 10 is suppressed. As a result, a reading section (not shown) can accurately read data signals from the disk 10, and data signals can be accurately recorded in the disk 10.

Figure 4:
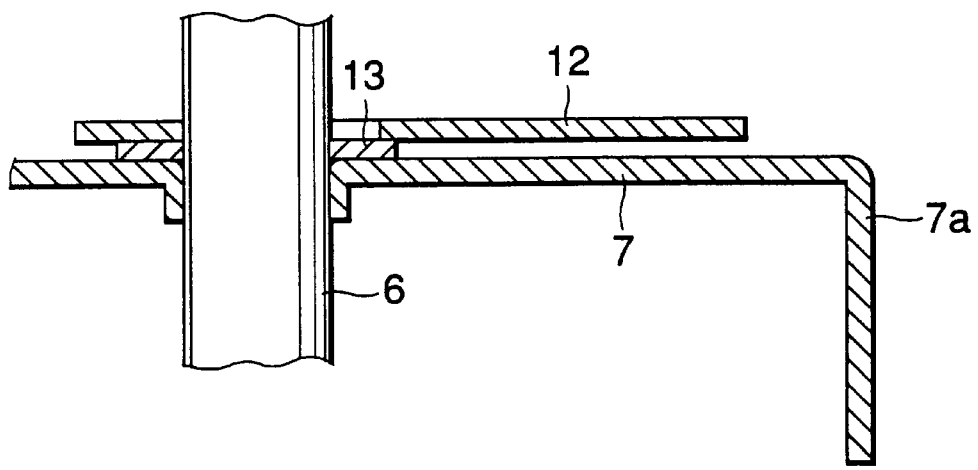
FIG. 4 is a sectional view showing the arrangement of another example of the spindle motor, which constitutes another embodiment of the invention.

In order to quickly cause the eccentric member 12 to cancel the unbalanced centrifugal force, it is preferable that the motor is designed as shown in FIG. 4. That is, a disk-shaped low-friction-coefficient member 13, which is low in friction coefficient and high in slidability, is mounted on the shaft 6 between the eccentric member 12 and the rotor casing 7. As was described above, when the speed of rotation of the rotor casing 7 reaches some value, the eccentric member 12 performs the action of canceling the unbalanced centrifugal force. On the other hand, as shown in FIG. 4, by mounting the low-friction-coefficient member 13 on the rotor casing 7 on the side where the eccentric member 12 is set, the frictional force between the eccentric member 12 and the rotor casing 7 can be decreased. Therefore, even when the speed of rotation of the rotor casing 7 is relatively low, the action of canceling of the unbalanced centrifugal force can be performed.

Figure 5:
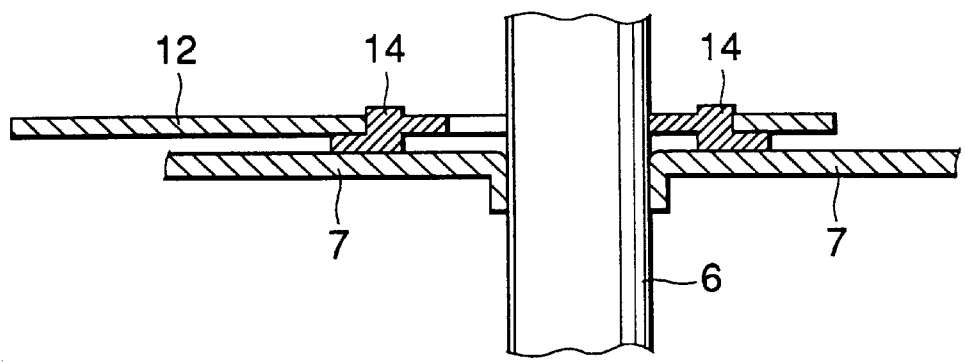
FIG. 5 is a sectional view showing the arrangement of another example of the spindle motor, which constitutes another embodiment of the invention.

In the case of FIG. 4, the low-friction-coefficient member 13 is provided between the eccentric member 12 and the rotor casing 7; however, it may be modified as shown in FIG. 5. That is, a ring-shaped member 14 which is low in friction coefficient and high in slidability may be fitted in the hole 12a of the eccentric member 12. In this modification, the friction between the eccentric member 12 and the rotor casing 7 is reduced, so that the action of canceling the unbalanced centrifugal force is performed quickly. The ring-shaped member 14 may be fitted in the eccentric member 12 or may be formed integral with the latter 12.

If the centrifugal force of the eccentric member 12 which cancels out the unbalanced centrifugal force attributing to the eccentric gravity center is equal to the unbalance of the centrifugal force which attributes to the eccentric gravity center of the disk 10, then it can completely cancel out the unbalance centrifugal force, so that the swinging of the shaft 6 attributing to the unbalance of the centrifugal force. The force which cancels out the above-described unbalance centrifugal force is smaller than the unbalanced centrifugal force, it is impossible to completely cancel out the unbalanced centrifugal force; however, it is possible to cancel out the unbalance centrifugal force corresponding to the unbalanced centrifugal force which attributes to the eccentric member 12, so that the swinging of the shaft can be effectively suppressed.

On the other hand, in the case where the unbalanced centrifugal force attributing to the eccentric member 12 is larger than the unbalanced centrifugal force attributing to the eccentric gravity center of the disk, the unbalance of the centrifugal force occurs as much as the centrifugal force attributing to the eccentric member 12 is larger than the unbalanced centrifugal force of the disk; however, if the unbalance between the centrifugal force attributing to the disk and the centrifugal force attributing to the eccentric force is in a predetermined small range, then the swinging of the shaft 6 can be suppressed in a small range.

Figure 2B:
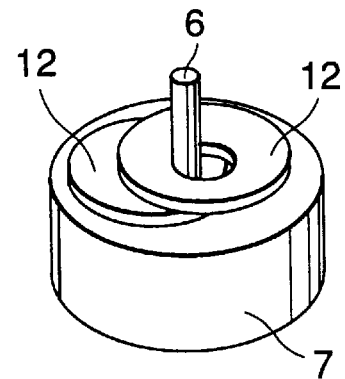

In the above-described embodiment, only one eccentric member 12 is mounted on the shaft; however, the invention is not limited thereto or thereby. That is, the motor may have a plurality of eccentric members. The part (b) of FIG. 2 shows an embodiment of the invention in which two eccentric members 12 are loosely mounted on the shaft 6. Hereinafter, the embodiment in which two eccentric members 12 is mounted on the shaft 6, will be described.

Figure 6:
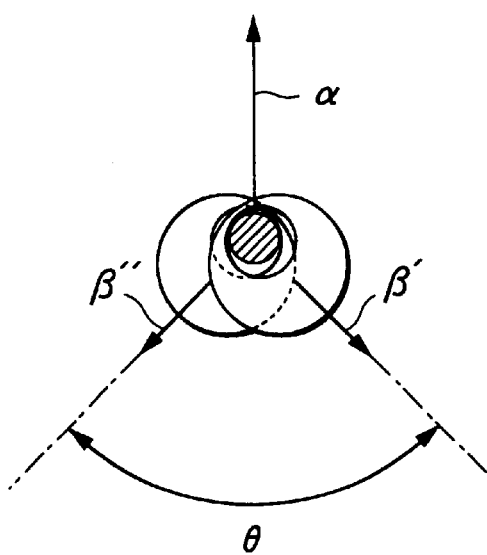
FIG. 6 is an explanatory diagram for a description of the action of two eccentric members applicable to the spindle motor of the invention.

As shown in FIG. 6, when the disk 10 is turned at high speed so that the unbalance of the centrifugal force attributing to the eccentric gravity center of the disk 10 is increased, then the two eccentric members 12 and 12 are turned together with the rotor casing while keeping an open angle θ between them. In this case, it is assumed that the centrifugal force of one eccentric member 12 is represented by β', and the canceling force of the other eccentric member 12 is represented by β". The resultant force of those forces β' and β" is formed in the direction opposite to the direction α of the unbalanced centrifugal force which attributes to the eccentric gravity center of the disk, and is equivalent to the unbalanced centrifugal force produced in the disk 10.

Accordingly, in this case, unlike the case where only one eccentric member 12 is provided, the resultant force of the centrifugal forces β'and β" can cancel out the unbalanced centrifugal force which attributes to the eccentric gravity center of the disk, and therefore even when the disk 10 is turned at high speed, the turn table 9 and the shaft will never swung. As a result, the data reading section is able to accurately read data signals from the disk 10, and data signals can be written in the disk 10.

In the embodiment shown in the part (b) of FIG. 2, M K/θ (where K=constant, and M is the resultant force of the centrifugal forces which attributes to the eccentric gravity centers of the two eccentric members 12 and 12. Hence, as the angle θ decreases, the resultant force M of the centrifugal forces is increased. In the case where the disk 10 has no eccentric gravity center, and is free from the unbalance of centrifugal force, the angle θ is 180°. In other words, the two eccentric members 12 and 12 is turned together with the disk while maintaining the open angle θ so as to allow the resultant force of the centrifugal forces to cancel out the unbalanced centrifugal force of the disk.

In the embodiment shown in the part (b) of FIG. 2 and FIG. 6, two eccentric members are provided; however, the invention is not limited thereto or thereby. That is, the technical concept of the invention may be applied to the spindle motor in which a plurality of eccentric members more than two are provided. That is, in this case, too, the resultant force of the centrifugal forces of the eccentric members cancels out the unbalance of the centrifugal force which attributes to the eccentric gravity center of the disk 10.

Now, another embodiment of the invention will be described with reference to FIG. 7.

Figure 7:
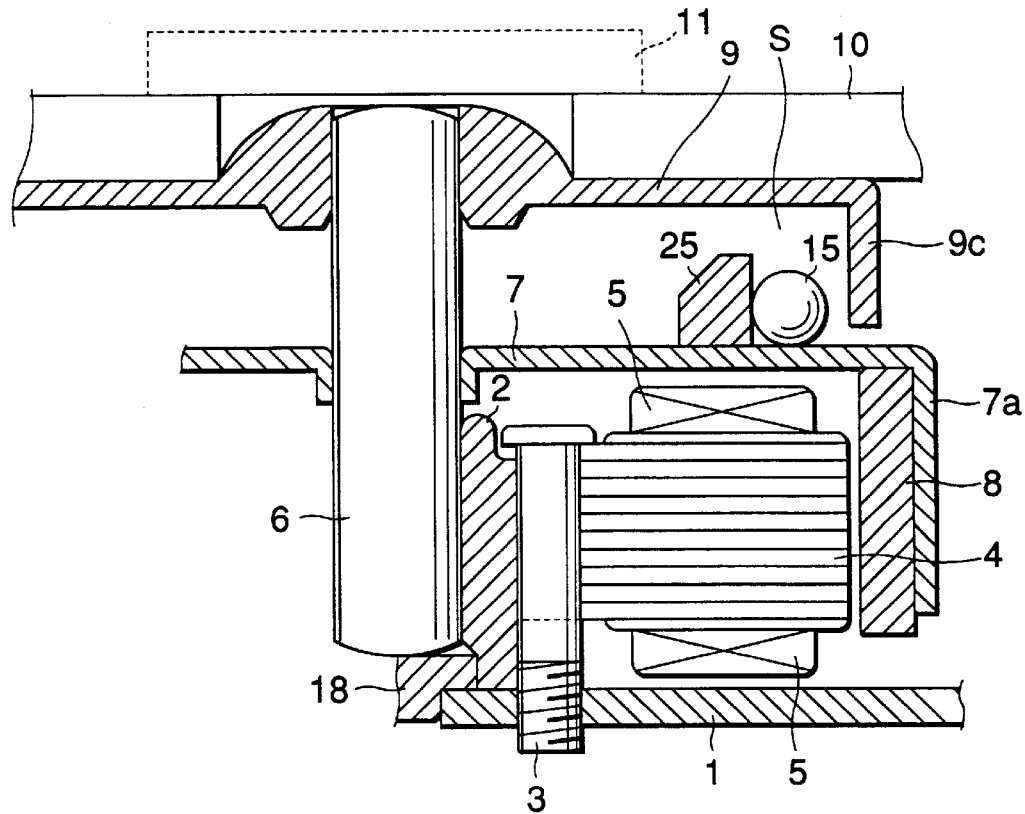
FIG. 7 is a sectional view showing the arrangement of another example of the spindle motor, which constitutes another embodiment of the invention.

In the embodiment, as shown in FIG. 7, its turn table 9 is equal in construction to the turn table of the above-described embodiments. The turn table 9 includes a cylindrical wall 9c which partially defines an annular space S. The annular space S is defined by the inner cylindrical surface of the cylindrical wall 9c, the upper surface of a rotor casing 7, and the lower surface of the turn table 9. A ball 15 such as a steel ball, which is a movable balance member, is rollingly provided in the space S. The cylindrical wall 9c prevents the ball 15 from coming out of the space S. As the turn table 9 turns, the aforementioned ball 15 revolves around the shaft 6 while being in contact with the inner cylindrical surface of the cylindrical wall 9c.

When the disk 10 is turned at high speed, the unbalance of centrifugal force may occur which attributes to the eccentric gravity center of the disk 10. Upon occurrence of the unbalance of the centrifugal force, the balls 15 moves in a direction opposite to the direction of the unbalanced centrifugal force. And the ball 15, while maintaining kept at a position to cancel out the unbalanced centrifugal force, revolves around the shaft in such a manner that it is in contact with the inner cylindrical surface of the cylindrical wall 9c.

Similarly as in the case of the eccentric member 12 in the above-described embodiment, when the ball 15 revolves around the shaft 6, a centrifugal force is produced in the ball 15. This centrifugal force cancels out the unbalanced centrifugal force which attributes to the eccentric gravity center of the disk 10.

Therefore, even when the disk is turned at high speed, the turn table and the shaft 6 are prevented from being swung. Accordingly, the reading section is able to accurately read data signals form the disk, and data signals can be accurately written in the disk 10.

Figure 8:
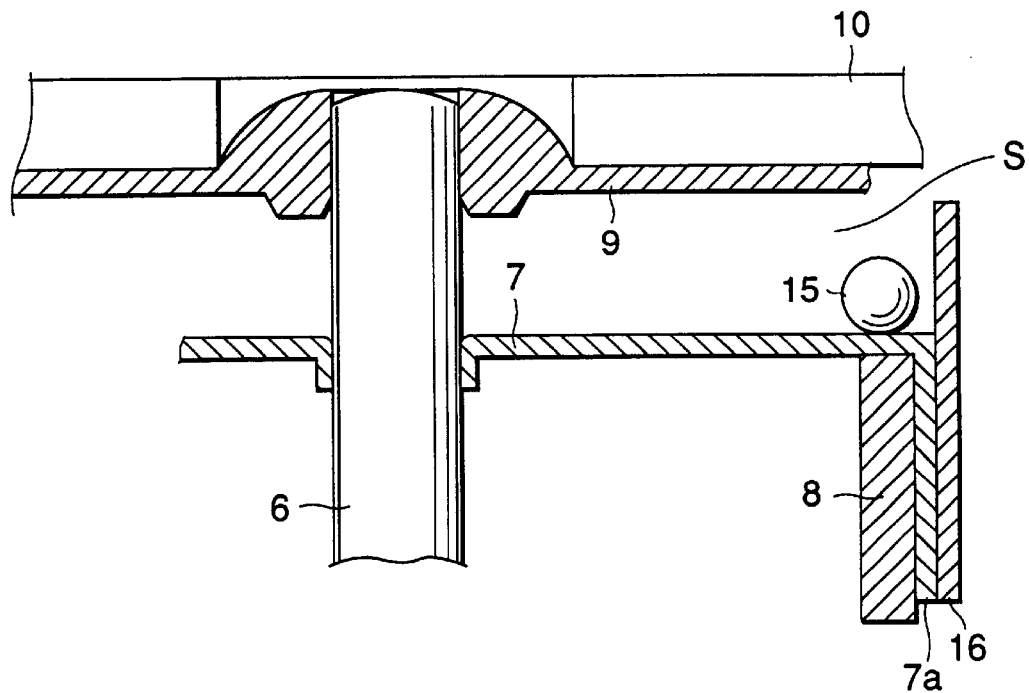
FIG. 8 is a sectional view showing the arrangement of another example of the spindle motor, which constitutes another embodiment of the invention.

In the embodiment shown in FIG. 7, the turn table has the cylindrical wall 9c; however, the invention is not limited thereto or thereby. That is, as shown in FIG. 8, a cylindrical wall 16 may be provided outside the outer cylindrical wall 7a of the rotor casing 7. The upper end portion of the cylindrical wall 16 is extended upwardly until it is located between the rotor casing 7 and the turn table 9, to form a space S inside the cylindrical wall 11. With the ball 15 placed in the space, the same effect is obtained.

The unbalanced centrifugal force canceled out by the ball 15 depends on the product of the mass of the ball 15 and the distance of the ball 15 from the shaft 6. When the mass of the ball 15 is increased, and the revolving position of the ball 15 is spaced away from the shaft 6, then the force of canceling out the eccentric gravity center is increased. In the case where a plurality of balls 15 are placed in the space S inside the cylindrical wall 9c, the resultant force of the canceling forces which are produced in the balls 15 can cancel out the unbalanced centrifugal force which is produced in the disk 10. In the case where a plurality of balls 15 are rollingly provided in the space S inside the cylindrical wall 9c, according to the theory which has been described with reference to the part (a) of FIG. 2, and FIG. 6, the open angle between the balls 15 changes depending on the unbalanced centrifugal force to be canceled out, so that the unbalanced centrifugal force can be completely canceled out.

In the case where, in order to eliminate the unbalance of the disk, the ball 15 is employed as described above, the behavior of the ball 15 is as follows: That is, when the rotor, such as the rotor casing 7 and the turn table 90, is turned at a constant speed, the ball 15, while being maintained substantially at the same position, revolves around the shaft 6 together with the cylindrical wall 9c as if it were stuck onto the inner cylindrical surface of the cylindrical wall 9c. On the other hand, in the case when the rotor is stopped, or is turned at low speed, the ball 15 is not held at a certain position, the sound of collision of the ball or the sound of rolling of the same 15 may be produced as noises.

In order to overcome this difficulty; that is, in order that the ball 15 is held when the rotor is stopped or turned at low speed, the following method may be employed: An annular magnet 25 is provided inside the cylindrical wall 9c, and a ball 15 of magnetic material is placed in the space S which is defined by the magnet 25 and the cylindrical wall 9c. The method has the following effect: When the rotor is stopped or turned at low speed, the ball 15 is magnetically attracted by the outer cylindrical surface of the magnet 25, thus being prevented from moving at random. When, on the other hand, the rotor starts rotation, and its speed of rotation exceeds a predetermined value, the ball 15 which has been attracted by the magnet 25 is left from the magnet 25, and collides with the cylindrical wall 9c. Upon collision of the ball 15, the ball 15 is moved to cancel the unbalance of the centrifugal force of the disk. Thus, the method is able to suppress the production of noises when the rotor is stopped or turned at low speed.

Figure 9A:
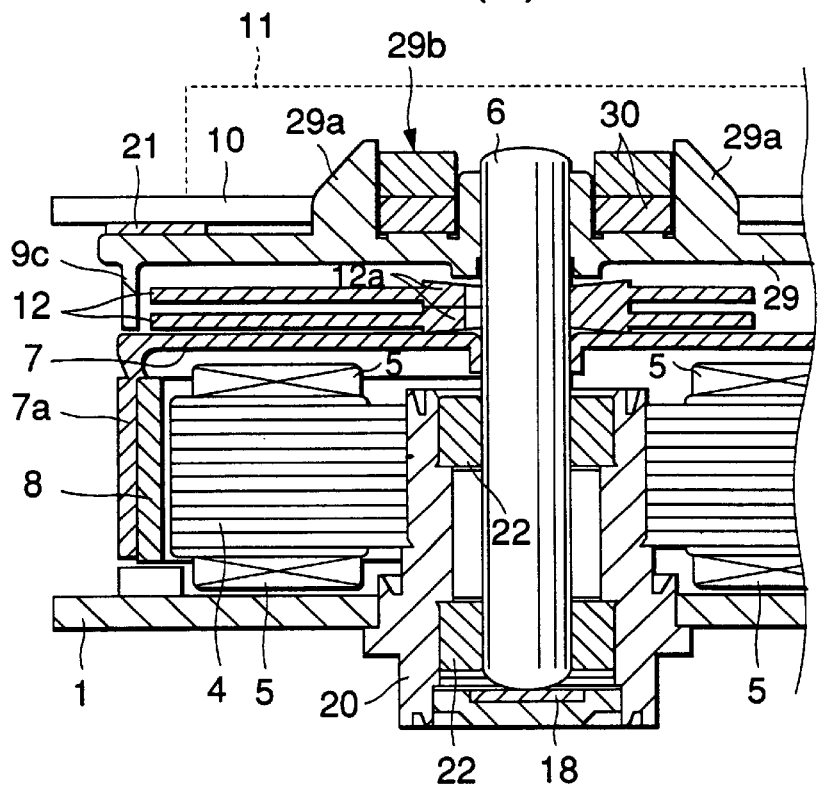
FIGS. 9(a) and 9(b) are also sectional views showing the arrangement of another example of the spindle motor, which constitutes another embodiment of the invention.
Figure 9B:
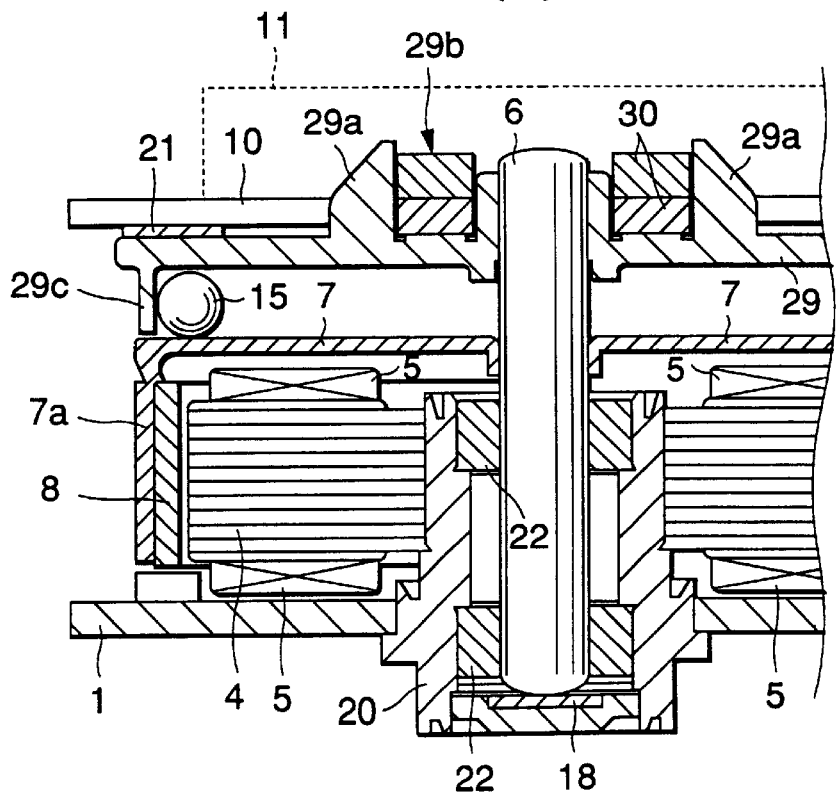

The technical concept of the invention can be applied to all kinds of motors such as motors with brushes, and motors employing ball bearings. In addition, the spindle motor may be modified optionally in the bearing structure, and in the turn table structure. FIG. 9 shows another embodiment of the invention which is different from the above-described embodiments in the bearing structure and in the turn table structure. The part (a) of FIG. 9 shows a spindle motor in which an eccentric member 12 is provided; and the part (b) of FIG. 9 shows a spindle motor in which a ball 15 is arranged.

In the part (a) of FIG. 9, a bearing holder 20 is secured to a central hole by punching which is formed at the center of a motor base board 1. The upper and lower end portions of the inner cylindrical surface of the bearing holder 20 hold cylindrical metal bearings 22 ad 22, respectively. The metal bearings 22 and 22 rotatably support a shaft 6. A thrust receiver 18 is set on the lower end face of the lower bearing holder 22 supports a load, in the direction of thrust, applied to the shaft 6.

A stator core 4 is fixedly secured to the outer cylindrical surface of the bearing holder 20, for instance, by punching in such a manner that the former 4 is coaxial with the latter 20. A drive coil 5 is wound on each of the protruded poles of the stator core 4. The upper portion of the shaft which is protruded from the upper end face of the upper bearing 22 is press-fitted in the central hole of a cup-shaped rotor casing 7; that is, the shaft 6 and the rotor casing 7 are provided as one unit. A drive magnet 8 is fixedly secured to the inner cylindrical surface of the rotor casing 7.

The inner cylindrical surface of the drive magnet 8 is confronted through a suitable gap with the outer end faces of the protruded poles which form the outer cylindrical surface of the stator core 4.

The end portion of the shaft 6, which is protruded from the upper end face of the rotor casing 7 is press-fitted in the central hole of a disk-shaped turn table 29 on which a disk 10 is mounted; that is, the shaft 6 and the turn table 29 are provided as one unit. A conical protrusion 29a is formed at the center of the upper surface of the turn table 29. The aforementioned central hole is located at the center as viewed radially.

A ring-shaped recess 29b is formed around the central hole of the aforementioned protrusion 29a, and a magnet 30 is fitted in the recess 29b. A rubber member 21 is mounted on the surface of the turn table 29 on which a disk 10 is mounted, in order to prevent the slip of the disk 10 thus mounted.

A clamp member 11 of magnetic material is arranged above the turn table 29. The clamp member 11 is to chuck the disk 10; that is, it is to press the disk 10 against the disk mounting surface of the turn table 29 which has been mounted on the latter 29. The chucking is achieved by utilizing the magnetic attraction force of the magnet 29b; that is, by magnetically attracting the clamp member 11 towards the turn table 29. The chucking of the disk 10 is not always limited to the use of the magnetic attraction force; that is, it may be achieved by using a suitable mechanical pressing force.

Two eccentric members 12 and 12 are loosely mounted on the shaft 6 between the rotor casing 7 and the turn table 29. In this case (where two eccentric members are employed), it is preferable that a thick portion 12a is formed around the hole of each of the eccentric members 12). The formation of the thick portions 12a decreases the friction force between the eccentric members 12 and the rotor casing 7. In the embodiment, each of the eccentric members is in the form of a circular disk, and has the hole at the position off the center into which the shaft 6 is inserted; however, the invention is not limited thereto or thereby. That is, the following eccentric member may be employed. A hole into which the shaft 6 is inserted is formed at the center of the disk-shaped member, and the disk-shaped member is made inclined in the distribution of weight.

In a spindle motor shown in the part (b) of FIG. 9, its turn table 29 has a cylindrical wall 29c which is located between the rotor casing 7 and the turn table 29, and a ball 15 is placed inside the cylindrical wall 29. The other arrangements are equal to those of the spindle motor shown in the part (a) of FIG. 9. Therefore, in the part (b) of FIG. 9, parts corresponding functionally to those already described with reference to the part (a) FIG. 9 are therefore designated by the same reference numerals or characters.

In the spindle motor shown in the part (b) of FIG. 9, the turn table 29 includes the cylindrical wall 29s to prevent the ball 15 from scattering; however, the invention is not limited thereto or thereby. For instance, a cylindrical wall may be formed on the outer cylindrical wall 7a of the rotor casing 7 in such a manner that it is located between the rotor casing 7 and the turn table 29.

In the spindle motor of the invention, the eccentric member or the ball are provided as the movable balance member. This feature makes it possible to cancel out the unbalanced centrifugal force which attributes to the eccentric gravity center of the disk, and to suppress, even when the disk is turned at high speed, the swinging of the shaft or turn table; that is, to decrease the vibration thereof. As a result, data signals can be accurately read from the disk, and can be accurately written in the latter.

Figure 10A:
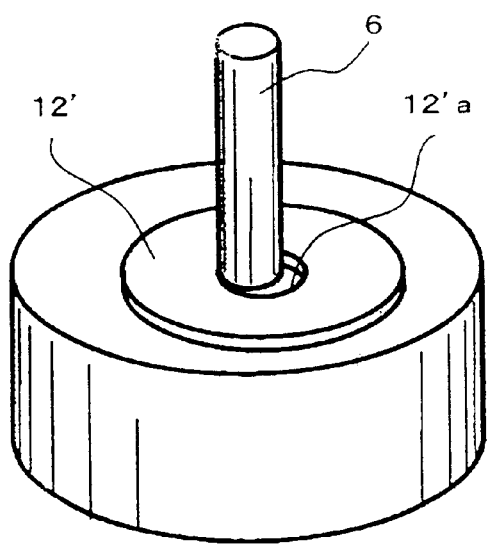
FIGS. 10(a) and 10(b) are perspective views showing another embodiment of the invention in which the eccentric member has a center hole at its approximate center.
Figure 10B:
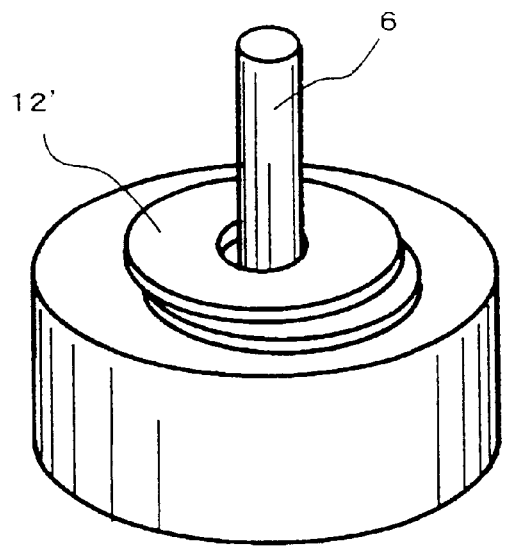

FIGS. 10(a) and (b) show another embodiment of the present invention. This embodiment is modified in view of the embodiment of FIGS. 2(a) and (b). A circular plate 12' is fitted on the shaft 8 of the motor. This plate 12' acts as the eccentric member. The circular plate 12' has a hole at approximately its center, which hole has a diameter larger than the outer diameter of the shaft 6. When the rotor case rotates, the eccentric member moves in an outer peripheral direction to rotate the eccentric member and the rotor case together. At that time, the inner peripheral portion of the hole is brought into contact with the outer peripheral portion of the shaft. Under this circumstance, since the diameter of the hole in the plate 12' is larger than the shaft diameter, the eccentric member is shifted from the rotation center. In other words, although the hole is provided at the center of the plate 12', the plate 12' acts as an eccentric member, Thus, while rotating the disk, the plate 12' cancels an unbalancing centrifugal force attributable to the eccentric gravity center to suppress the shaft deviation and to prevent the generation of vibration.

What is claimed is:

1. A spindle motor comprising:

a shaft rotatably supported;

a rotor casing turned together with said shaft;

a turn table fixedly mounted on one end portion of said shaft and rotated with a disk mounted thereon;

an eccentric member loosely mounted on a part of said shaft said eccentric member located between said rotor casing and said turn table, and turned for canceling an unbalancing centrifugal force attributable to an eccentric gravity center with the rotation of said rotor casing;

wherein said eccentric member has a hole larger in diameter than said shaft at a position which is off the gravity center thereof said hole being loosely fitted on said shaft.

2. A spindle motor as claimed in claim 1, wherein said eccentric member is turned while being maintained in a direction in which said eccentric member cancels out the eccentric gravity center.

3. A spindle motor as claimed in claim 2, wherein more than one eccentric member are loosely fitted on said shaft.

4. A spindle motor as claimed in claim 1, wherein said eccentric member is in the shape of a circular plate, and wherein an area of said circular plate on one side of said hole is larger than a remaining area of said circular plate on the other side of said hole.

5. A spindle motor as claimed in claim 4, wherein a low-friction-coefficient member is interposed between said eccentric member and said rotor casing and wherein said eccentric member is smaller than an outer diameter of said rotor casing.

6. The spindle motor according to claim 1, wherein said eccentric member is a circular plate having a hole formed in said circular plate, said hole having a diameter larger than a diameter of said shaft for receiving said shaft.

7. The spindle motor as claimed in claim 6, wherein a maximum gap between said shaft and an inside of said hole is smaller than a diameter of said shaft.

8. The spindle motor as claimed in claim 6, wherein an area of said circular plate on one side of said hole is larger than a remaining area of said circular plate on the other side of said hole.

* * * * *